(12) United States Patent
Backmann et al.

(10) Patent No.: US 11,541,587 B2
(45) Date of Patent: Jan. 3, 2023

(54) METHOD FOR CONTROLLING FILM PRODUCTION

(71) Applicant: Windmöller & Hölscher KG, Lengerich (DE)

(72) Inventors: Martin Backmann, Lengerich (DE); Markus Bussmann, Essen (DE)

(73) Assignee: Windmöller & Hölscher KG, Lengerich (DE)

( * ) Notice: Subject to any disclaimer, the term of this patent is extended or adjusted under 35 U.S.C. 154(b) by 165 days.

(21) Appl. No.: 16/608,871

(22) PCT Filed: Apr. 20, 2018

(86) PCT No.: PCT/EP2018/060196
§ 371 (c)(1),
(2) Date: Oct. 28, 2019

(87) PCT Pub. No.: WO2018/197362
PCT Pub. Date: Nov. 1, 2018

(65) Prior Publication Data
US 2020/0086546 A1 Mar. 19, 2020

(30) Foreign Application Priority Data
Apr. 26, 2017 (DE) .................. 10 2017 108 923.3

(51) Int. Cl.
*B29C 48/92* (2019.01)
*B29C 48/10* (2019.01)
(Continued)

(52) U.S. Cl.
CPC .......... *B29C 48/92* (2019.02); *B29C 48/0018* (2019.02); *B29C 48/10* (2019.02);
(Continued)

(58) Field of Classification Search
CPC ..... B29C 48/92; B29C 48/10; B29C 48/0018; G05B 19/41875; G05B 2219/32368
See application file for complete search history.

(56) References Cited

U.S. PATENT DOCUMENTS

| 2014/0332994 A1* | 11/2014 | Danes | G01N 23/223 |
| | | | 264/40.1 |
| 2016/0009014 A1* | 1/2016 | Schmitz | B29C 48/49 |
| | | | 264/40.1 |

(Continued)

FOREIGN PATENT DOCUMENTS

| DE | 10300375 | 7/2004 |
| EP | 2392446 | 12/2011 |
| WO | WO 2018/197362 | 11/2018 |

OTHER PUBLICATIONS

International Preliminary Report on Patentability dated Oct. 29, 2019 From the International Bureau of WIPO Re. Application No. PCT/EP2018/060196. (9 Pages).
(Continued)

*Primary Examiner* — Thomas C Lee
*Assistant Examiner* — Ameir Myers

(57) ABSTRACT

The invention relates to a method (100) for controlling a film production in which at least one film is produced depending on at least one specific recipe information (R), where the following steps are performed:

providing different fingerprints (F), the fingerprints (F) characterizing different method executions (210) for producing a film, providing in each case at least one result information (E) for the respective fingerprint (F), the result information (E) being specific for at least one product property (D) of the produced film, storing the fingerprints (F) and result information (E) as data in a data system (200) so that the data is provided as a basis for evaluation for controlling at least one subsequent method execution (210).

13 Claims, 5 Drawing Sheets

(51) Int. Cl.
*B29C 48/00* (2019.01)
*G05B 19/418* (2006.01)

(52) U.S. Cl.
CPC .............. *G05B 19/41875* (2013.01); *G05B 2219/32368* (2013.01)

(56) References Cited

U.S. PATENT DOCUMENTS

| 2019/0240889 | A1* | 8/2019 | Lettowsky | B29C 48/92 |
| 2020/0047391 | A1* | 2/2020 | Lettowsky | B29C 48/92 |
| 2021/0157247 | A1* | 5/2021 | Ypma | G03F 7/705 |

OTHER PUBLICATIONS

Internationaler Recherchenbericht und Schriftlicher Bescheid [International Search Report and the Written Opinion] dated Jul. 24, 2018 From the International Searching Authority Re. Application No. PCT/EP2018/060196 and Its Translation Into English. (28 Pages).

Du et al. "Modeling and Control of Vibration in Mechanical Systems: Control Strategy", CRC Press, XP002782809, Chap.4.4.3: 86, Apr. 16, 2010.

Lavretsky "Example 6.3: Consider An LTI System", Advanced Topics in Systems and Control, Lecture 3, XP002782810, Chap.6: 23-31, Apr. 16, 2010.

Mitteilung gemaB Artikel 94 (3) EPO [Communication Pursuant to Article 94(3) EPC] Dated Oct. 4, 2021 From the European Patent Office Re. Application No. 18719538.3 together with English Summary. (10 Pages).

\* cited by examiner

METHOD FOR CONTROLLING FILM PRODUCTION

RELATED APPLICATIONS

This application is a National Phase of PCT Patent Application No. PCT/EP2018/060196 having International filing date of Apr. 20, 2018, which claims the benefit of priority of European Patent Application No. 10 2017 108 923.3 filed on Apr. 26, 2017. The contents of the above applications are all incorporated by reference as if fully set forth herein in their entirety.

FIELD AND BACKGROUND OF THE INVENTION

The present invention relates to a method for controlling a film production in which at least one film is produced depending on at least one specific recipe information. Furthermore, the invention refers to a control system and a computer program product.

It is known from the state of the art that films are manufactured depending on production information, the so-called recipe. This recipe is used to at least partially automatically parameterize the film production by defining various individual parameters, such as a material mixture or various method parameters for the film production machine. The film is produced, for example, by blowing, and the film production machine is, for example, an extrusion machine or the like.

It is also known that such film production machines monitor production parameters, i.e. the production is checked on the basis of the monitoring information determined. For example, temperature monitoring or film thickness monitoring is provided. In particular, an operator of the film production machine manually influences the production on the basis of the monitoring information.

A disadvantage of the well-known solutions for controlling film production is that monitoring and quality assurance during production often turns out to be complex. In particular, the technical implementation of monitoring and quality assurance is difficult and costly. For example, it is common for the film to be inspected only after film production or after further processing, e.g. by laboratory tests, in order to check the quality of the film. If the film does not meet the quality requirements, the film must be replaced. This leads to additional time and costs in film production and use.

SUMMARY OF THE INVENTION

It is therefore an object of the present invention to at least partially eliminate the disadvantages described above. In particular it is an object of the present invention to enable an improved film production in which a sufficient film quality can be guaranteed. In particular, film production should be simplified and implemented more cost-effectively.

The preceding object is solved by a method with the features of claim 1, by a control system with the features of claim 14 and by a computer program product with the features of claim 16. Further features and details of the invention result from the respective dependent claims, the description and the drawings. Features and details which are described in connection with the method according to the invention also apply, of course, in connection with the control system according to the invention as well as the computer program product according to the invention, and vice versa, in each case, so that with regard to the disclosure to the individual aspects of the invention, mutual reference is or can always be made.

In particular, the object is solved by a method for controlling film production in which at least one film is produced dependent on at least one recipe information (recipe) specific to it. In particular, film production is a blown film production in which at least one film is produced as a blown film. The film is preferably a plastic film, in particular stretch film, and preferably configured as an endless product.

Preferably, film production, i.e. in particular at least one method execution of film production, is performed in such a way that the recipe information is used to at least partially automatically parameterize film production, in particular by defining various individual parameters, such as a material mixture or various method parameters for a film production machine, such as an extruder.

In particular, it is provided here that at least one of the following steps is performed, preferably the steps being performed one after the other or in any order, preferably individual steps also being able to be performed repeatedly:

determining different fingerprints, wherein different method executions for producing a film are characterized by the fingerprints, (i.e. in particular that in each case one fingerprint characterizes a respective method configuration in which in each case at least one film is produced at a time), providing in each case at least one result information for the respective fingerprint, wherein the result information is (at least) specific to at least one product property of the (respectively) produced film, (i.e. in particular that for each of the method executions at least one respective associated result information about a result of that respective method execution, in particular the product property of the film produced in this way, is provided), storing the respective fingerprints and the respective result information as data in a data system, in particular a database system, so that the data are made available as an evaluation basis for a control (at least one of the different method executions and/or) of at least one subsequent method execution (in particular central) (preferably the respective fingerprints and the respective result information being stored with a time delay, preferably in each case after the respective fingerprints or the respective result information have been made available).

In other words, fingerprints and result information from previous method executions can be used to control, in particular evaluate and/or monitor and/or control and/or regulate subsequent method executions. This has the advantage that a time-consuming and costly analysis can be dispensed with in order to evaluate the quality of a method execution. Optionally it is possible that this control is already performed during the method execution. In this case the quality of the film can be directly influenced, e.g. by a corresponding control of a film production machine on the basis of the data. In order to use the data for the control, the data can be evaluated e.g. (automated), e.g. by at least one (statistical) analysis. In particular, a control matrix can be determined, preferably adapted, on the basis of the evaluation. This control matrix can then be used to control the subsequent method execution.

According to a possible embodiment of the invention, it may be provided that the provision of a respective fingerprint is performed during or after a respective method execution, e.g. by a transmission of data from a film production machine and/or a monitoring device for the method execution to a provision unit. For example, the provisioning unit is configured as an interface unit (such as a network interface or an input interface) of a computer system which, in particular, provides the data system. In particular, the transmitted data is specific to the fingerprint. Subsequently, the respective result information for the respective method execution can be provided as soon as it is available. This can also be done, for example, by transmitting or (manually) entering further data, which is specific for the result information, to the (or another) provision unit of the computer system. After the respective provision the data can be stored, e.g. by reading out and processing the data by a processing unit, such as a processor of the computer system, whereby the data is stored in the data system, in particular in a data storage unit of the computer system. These steps (the respective provision and respective storage) can then be repeated for further fingerprints and result information.

In other words, the step of storing the respective fingerprints and the respective result information(s) in accordance with the method according to the invention may each comprise at least a first storage operation for the fingerprint and a second storage operation for the result information, which may be performed simultaneously or at different times. After both the associated fingerprint and the associated (at least one) result information have been provided and stored for a specific method execution, the data can be used for monitoring and, if necessary, evaluation. It may be possible that for each further method execution (including one that is controlled on the basis of the data), an associated fingerprint and at least one associated result information is provided and stored again. Thus, the data collection, which can be used for control, grows continuously. As this improves the informative value of the data, this method enables an optimization of the control.

In particular, it is provided that the different fingerprints will each characterize a different method execution for the production of a (respective or a single) film. For example, the film is produced on the basis of specific recipe information for a particular method version. In order to now provide the respective fingerprints, it can be provided to determine a respective fingerprint for each method execution at least on the basis of the respective specific recipe information of this method execution and on the basis of monitoring information of this method execution. The monitoring information is determined, for example, by monitoring during method execution, in particular by recording (preferably measuring) individual parameters during method execution, in particular with a film production machine. The recorded individual parameters are preferred here at least in part specified by the recipe information and/or can also differ in part from the individual parameters of the recipe information. This enables a simple and unambiguous characterization of a certain method execution so that it can be distinguished from other method executions.

Within the scope of the invention, the data system is preferably configured as an (electronic) data system for electronic data management. Such a data system is for example a data base system with at least one data base for the storage and supply of the data. For example, the database system can be purely software-based, or it can include a computer to provide the data. For this purpose, the computer includes, for example, a data storage unit such as a hard disk and/or a processor for processing the data. In particular, it can also be a networked database system, e.g. with distributed computers with data storage units. It may also be possible for the database system (in particular networked) to be connected to a film production machine in order, for example, to obtain a fingerprint and/or monitoring information for a method execution of this film production machine and/or to provide a control matrix via the data connection. Preferably, the data connection can be provided via an Ethernet network or LAN (Local Area Network) or Internet or WLAN (Wireless Local Area Network) or the like. In particular, the data system is part of a control system for performing the method according to the invention.

Furthermore, it may be possible for the result information to be executed in each case as information about a result of the respective method execution, in particular about the quality and/or at least one product property of the film produced thereby, and preferably to be provided by a laboratory evaluation and/or by the film production machine and/or manually by a user and/or by a further processing machine for the film, such as a roller or the like. For example, the result information provided in each case can be transmitted to the data system via a network, e.g. via a mobile phone network or an Ethernet network or LAN or Internet or WLAN or similar. Preferably, the respective result information is assigned to a fingerprint, i.e. a fingerprint that characterizes the method execution for which the result information is specific. This can be, for example, the method execution in which the film was produced, on the basis of which the result information was determined. In other words, by comparing the result information with an associated fingerprint, a particular method execution can be evaluated in relation to the result of that method execution. A more extensive (e.g. statistical) evaluation of further fingerprints and related result information, in particular also among each other, may lead to the determination of correlations which are relevant for the guarantee of quality in film production. For example, evaluation criteria can be defined (using a control matrix), such as a tolerance range for at least some of the individual parameters. Preferably, these evaluation criteria enable the (expected) quality of the associated method execution to be evaluated and/or predicted on the basis of a fingerprint. In particular, the evaluation described above can be used to optimize this evaluation and/or prediction on the basis of the result information from previous method executions. For example, depending on this evaluation, an adjustment of the evaluation criteria or the control matrix is necessary.

For example, the tolerance value range can be compared with the values of the monitoring information of the fingerprints during evaluation. If necessary, the result information for these fingerprints can also be taken into account. Preferably, the tolerance value range can then be adjusted on the basis of the evaluation, so that this includes those values of the monitoring information that lead to a higher quality if possible. This is a simple example of such an evaluation, whereby more complex statistical analyses can also be provided for evaluation (such as autocorrelation, linear prediction, pattern recognition, the use of neural networks, self-learning, artificial intelligence, etc.).

Preferably (preferably through the control matrix) an optimal evaluation basis for subsequent method executions can be provided on the basis of the stored data in order to be able to evaluate the quality of the produced film quickly and reliably.

It may be possible that when different fingerprints are provided, at least 10 or at least 100 or at least 1000 or at least 10000 fingerprints are provided, each of which is characterized by different method executions. It may be possible for a control matrix to be continuously adjusted (for further method executions) based on stored fingerprints and result information so that the control matrix continuously improves control. In other words, the control matrix can be optimized in the course of film production.

Furthermore, it may be provided in the invention-based method that the control of at least one subsequent method execution is (only) performed on the basis of the fingerprint, which is determined in this method execution, in comparison with a control matrix, preferably without evaluating or having to determine result information of this method execution, such as a product property of the film produced thereby. The control matrix can be determined on the basis of the stored data (fingerprints and result information from previous method executions), so that a correlation of previous fingerprints with result information serves to control the subsequent method execution. This enables a quick and/or immediately evaluation of a subsequent, active or fully executed method execution in order to determine or forecast whether the quality of the film is sufficient. This eliminates the need for costly laboratory tests or the like to evaluate the film quality (at least for an initial quality prognosis). Optionally, the result information can still be determined on the basis of the film produced, e.g. on the basis of laboratory data and/or data from subsequent machines (further processing data). However, this can then serve in particular to improve the subsequent control of subsequent method executions, in particular by optimizing the control matrix. For this purpose, the newly determined result information with the corresponding fingerprint of the subsequent method execution can also be stored in the data system.

In particular, in the context of the invention "control" is understood to mean that monitoring and/or checking and/or evaluation and/or adaptation and/or control and/or regulation of film production, in particular of at least one (subsequent) method execution, preferably of a film production machine and/or of individual parameters, takes place. This can also include, for example, a control, i.e. in particular a monitoring and/or evaluation, of a result of the method execution, i.e. the film produced. The method execution, i.e. in particular the individual parameters for operating at least one film production machine, such as an extruder, can also be controlled, i.e. regulated and/or controlled. Preferably in this case the control includes the adjustment on the basis of a (measured) actual value of the individual parameters in comparison with a respective set value for the individual parameters. In particular, the framework conditions for the actual and set values can be specified by the control matrix, e.g. by a tolerance value range of the control matrix, such as upper and lower limits for the values. The control, in particular the control and/or regulation and/or evaluation, may also relate to the consideration of this tolerance value range. For example, the tolerance value range is compared with the actual and/or target values which are used in the method execution. This has the advantage that the quality of the method execution and/or the film produced can be evaluated and/or guaranteed by comparing a fingerprint with the control matrix. The control matrix therefore represents an evaluation basis which defines the framework conditions for achieving the desired quality of the film.

In other words, the control matrix may contain information which is used for control, in particular for evaluation, film production or subsequent method execution. Such information is, for example, at least one tolerance value range, i.e., an upper and lower limit for values of monitoring information and/or the recipe information of a fingerprint. For example, the quality of the film is significantly influenced by the recipe information, which in particular includes specifications, e.g. set values, for individual parameters (as a so-called recipe for film production). In particular, the specifications may include at least one set value for the individual parameters in order to perform a corresponding control of the method execution (e.g. by means of a control system for the film production machine, such as a temperature control system). The monitoring information, on the other hand, can include, for example, measured actual values of the individual parameters of the method execution. Preferably, the control matrix can include additional specifications or control criteria, such as a tolerance value range in which the actual and/or set values of the individual parameters should be located during the method execution. Compliance with this tolerance value range can be determined, for example, by comparing the control matrix with the fingerprint. In particular, if the tolerance value range is not observed, this can result in a corresponding check, i.e. a negative evaluation of the quality, for example, or an active counter measurement or control of the method execution, or also an adaptation of the recipe information to guarantee the quality. The comparison and/or control is made possible, for example, by the monitoring information which, for example, is the result of monitoring the individual parameters during a (subsequent) method execution.

In particular, the use of a control matrix as a basis for evaluation allows a simple definition of evaluation criteria, which are provided by the information of the control matrix (such as a tolerance value range). Preferably, the evaluation criteria can be continuously optimized to achieve the desired quality by determining and/or adapting the control matrix on the basis of newly stored data for subsequent method executions. In addition, the advantage can be achieved that through the determination of fingerprints and/or the comparison of fingerprints with the control matrix, a simple and flexible quality control is enabled, which can, for example, also be performed computer-aided and/or networked and/or automated.

For example, at least one control matrix is determined and/or adapted by performing an evaluation of the stored fingerprints and/or result information (of preceding method executions), so that an evaluation result is preferably determined. In particular, the control matrix can then be determined on the basis of the evaluation result. The evaluation may, for example, include an analysis of the different fingerprints and/or result information, in particular a statistical analysis. For this purpose, for example, the fingerprints are assigned to associated result information which is specific to the respective fingerprints (i.e., the respective result information was determined using a film which was produced by the method execution which characterizes the fingerprint). In particular, the evaluation may include the determination of a correlation between the different fingerprints and/or different result information (autocorrelation). For example, the evaluation also includes the use of complex (statistical) analyses, such as linear prediction and/or trend analysis and/or pattern recognition and/or neural networks and/or artificial intelligence and/or the like.

Preferably a method according to the invention, the fingerprint can also be stored digitally, optionally with further information (such as an associated control matrix and/or an identifier for method execution, such as a time stamp or the like), preferably in the data system (such as a database system). In particular, the fingerprint includes the recipe information so that the individual parameters of the recipe information used in the associated method execution can also be accessed at a later point in time. For example, if the comparison of the fingerprint with the control matrix reveals a particularly good approximation to a quality result, the recipe information of the fingerprint can be marked accordingly and/or used for subsequent method executions. Also, an analysis of one or more fingerprints, particularly depending on a respective comparison result (the comparison with the control matrix), may determine a correlation between the recipe information and the result obtained thereby (e.g. the associated result information on the quality of the film produced in the method execution associated with the fingerprint). This allows conclusions to be drawn about particularly promising prescription information for a particular result.

It is preferred that a multitude of fingerprints for a multitude of different method executions be stored in the data system, e.g. at least 10 or at least 100 or at least 1000 or at least 10000, and preferably evaluated on the basis of the respective result information. In particular, a correlation and/or trend between fingerprints and/or in relation to result information and/or other data shall be established. For example, the result information and/or other data can come from different data sources. For example, data can be determined during the further processing of the film (further processing data) and/or the use of the produced film. Further processing includes, for example, processing by a roller, especially if the film is configured as a stretch film. The data can, for example, be determined automatically and/or entered manually. On the basis of the evaluation, the (active) subsequent method execution (in particular by comparing the fingerprint of the method execution with the control matrix) can then be checked directly and/or subsequent method executions can be checked on the basis of the evaluation.

In particular, it is possible that a method execution includes an entire production or a production step or a sub-method of a production of a film. In particular, a film production machine, e.g. as part of an extrusion line for the production of a blown film, is controlled, i.e. controlled and/or regulated, on the basis of the recipe information. It is possible that a change in the recipe information immediately causes a change in the film produced, as this changes, for example, a material mixture. Accordingly, the fingerprint can be used to uniquely characterize the method execution and thus be clearly distinguished from other method executions on the basis of the respective fingerprints.

It may be possible that several (subsequent) fingerprints are determined for several subsequent method executions. For example, each fingerprint can be compared with a control matrix in order to continuously monitor film production, for example to monitor and/or adjust the quality of the film produced. The control matrix can also be adjusted in each of these comparisons if necessary, in particular to optimize the quality of film production. This adaptation takes place, for example, by evaluating a result of the respective method executions (in particular by a respective subsequent result information, such as a product property of the film produced, preferably automated). For example, depending on a deviation of this result information, the control matrix can then be adapted (automatically) to a given desired result in order to achieve a changed result in a subsequent method execution. This adaptation can be done in such a way that the control matrix is optimized to achieve the desired result. This can be done, for example, by iterative evaluation of the result information and adjustment depending on this evaluation. It is also possible that the evaluation may also include an evaluation of the recipe information and/or the adaptation may also include an adaptation of the recipe information. Depending on the result, the recipe information can thus be optimized in such a way that the desired result is achieved in a method execution on the basis of the recipe information.

Furthermore, it may be possible, in the case of a method in accordance with an invention, for monitoring information to be determined for each respective method execution in order to provide the fingerprints, and a recording (in particular measurement) of individual parameters, in particular of properties of the material mixture and/or of method parameters and/or method variables in the method execution, may preferably be performed in order to determine the monitoring information. Preferably the fingerprints are stored in such a way that the stored fingerprints include the monitoring information. In particular, this can have the advantage that the data as a basis for evaluation can be used to provide monitoring information to improve the evaluation of the quality of previous and/or subsequent method executions.

The quality of the method execution means, for example, that at least one result information of the method execution is evaluated, e.g. a product property of the film produced in the method. For a given quality, this result information must meet certain criteria, e.g. a given tensile strength of the film or the like must be achieved. In other words, quality refers preferably to (product) properties of the film. These product properties can be determined, for example, to determine the result information directly during method execution (inline) or also outside method execution (offline). For example, the result information may include at least one quantitative information (for example, a measured property as a product property, such as a degree of tensile strength, a stress elongation curve, a thickness or geometry of the film, a basis weight or the like) or at least one qualitative information (for example, a user feedback as to whether damage has occurred to the film). Furthermore, the result information can also have an assignment to a position (i.e. position information). This enables, for example, product properties to be assigned to film positions during film production depending on the running meter. In particular, the position information also allows conclusions to be drawn about the fingerprint or the values of the fingerprint that were determined at a certain position during the production of the film. These fingerprint values are, for example, monitoring information. On the basis of the result information, it can also be concluded to what extent the monitoring information may deviate from a certain tolerance value range in order to achieve the desired result. In other words, a tolerance range of a control matrix can also be adapted according to a further embodiment on the basis of the result information, so that the control matrix is optimized.

The monitoring information preferably comprises at least one piece of information about the individual parameters and is determined, for example, by detecting (in particular measuring) properties of the material mixture and/or method parameters and/or method variables during method execution. For example, the fingerprint can include both the monitoring information determined for a specific method execution and the recipe information used for this method execution. This enables the associated method execution to be characterized very comprehensively on the basis of the fingerprint. Thus, the fingerprint can be used to subsequently evaluate and/or analyze the method execution and/or, if the result is good, the associated method execution can be repeated in a similar manner in order to reproduce the result obtained (i.e. in particular the product properties of the film produced). An analysis of different fingerprints can, for example, be performed by comparing the stored fingerprints with the stored result information obtained during the respective method executions and/or with each other. For example, an optimal fingerprint can be determined in order to achieve a certain result.

However, it is often not possible to perform a subsequent method execution in such a way that the earlier method execution on which this optimal fingerprint is based is completely reproduced. Deviations in the individual parameters may therefore occur, which can, for example, be recorded by the monitoring information. The comparison of this monitoring information with the control matrix enables the assurance that these deviations do not exceed a specified limit. The control matrix can also be determined and optimized on the basis of the analysis, in particular on the basis of a correlation of the stored fingerprints and/or associated stored result information, in order to perform subsequent method executions in such a way that a certain result is reproduced in sufficient approximation. For the analysis, the fingerprints can be stored permanently (non-volatile) in the data system and made available. In particular, the result information can also include error information in order to determine the cause of the error by means of the analysis. The correlation can, for example, include an autocorrelation (of the stored data or fingerprints), so that a cause for an error in method execution can be reliably identified. The result information can also include, for example, film production-specific information about a blocking and/or edge break and/or a type level and/or a slope.

According to a further advantage, the recipe information comprises at least one information about at least one individual parameter for parameterizing film production, in particular method execution, preferably at least one film production machine. The individual parameter is, for example, a material mixture and/or a method parameter and/or a method variable by which the method execution can be influenced. For this purpose, for example, a film production machine, such as an extruder, can be set on the basis of the values specified by the recipe information for at least some of the individual parameters. Also, at least some of the individual parameters, such as the material mixture, influence the composition of the film to be produced. The material mixture comprises, for example, at least one parameter of a raw material of the film (e.g. per layer of the film) or of a material of the film. The material mixture can also include at least one parameter of the layers of the film, such as a layer thickness and/or a layer sequence and/or a number of layers. The material mixture can also affect a mixing ratio per layer. On the other hand, the method parameter can include a controllable variable, such as a film speed and/or a frost line of the film and/or a pressure and/or a temperature during film production, such as a melt temperature and/or cooling air temperature and/or melt temperature, and/or a pressure during film production. In particular, a "simple dependency" exists for the method parameter, i.e. the method parameter provides a set value in order to adjust a determined actual value to the set value in accordance with a control during method execution. On the other hand, the individual parameter "method variable" can include parameters that have a "complex dependency". This means that it may not be possible to simply control the method variables in the sense of the method parameters. For example, the method variables are significantly determined by a number of influencing factors that require more complex control and/or manual intervention during method execution.

A further advantage can be achieved in the according to the invention if the provision of the fingerprints includes at least one of the following steps, which are preferably performed one after the other:
  determining the respective monitoring information during the respective method execution, in particular by measurements performed on a film production machine,
  determining a respective fingerprint based on the respective monitoring information and a respective specific recipe information of the method execution so that the respective method execution is characterized based on the fingerprint.

This has the advantage that the method execution can be characterized in a simple way by fingerprint information relevant for quality assurance.

The invention may preferably provide for at least one measurement to be performed in each case during the method executions in order to determine the respective monitoring information, the measurement preferably being performed for at least one method parameter and/or at least one method parameter during the method execution. For example, the monitoring information can also include a running meter position of the produced film, so that the determined monitoring information can be assigned to a film position. This can be used, for example, to determine a certain position range of the film for which a certain quality was determined by comparing the fingerprint with the control matrix.

In particular, it is provided that the respective monitoring information comprises at least one value sequence which is specific for at least one measurement result in the respective method execution, the measurement result preferably being determined by a measurement at at least one film production machine, in particular at a specific position of the film. Preferably the position information indicates this position of the film.

In another possibility, it may be provided that the (respective) recipe information for different individual parameters of the (respective) method execution comprises at least a portion of information each, in particular:
  at least a portion of the information for the material mixing during the method execution, in particular about layers of the film and/or about a raw material for at least one of the layers and/or about a thickness of at least one of the layers and/or about at least one layer sequence and/or number and/or about a mixing ratio of at least one of the layers,
  at least a portion of the information for at least one method parameter of the method execution, preferably about a film speed and/or about a temperature and/or about a pressure in the method execution, in particular in a film production machine,
  at least a portion of the information for a method variable of the method execution.

This enables a comprehensive evaluation of the prescription information and/or the monitoring information. Furthermore, it may be possible that the method variable depends on the method parameter and/or on physical and/or external influences by and/or on a film production machine, in particular according to a complex dependency.

Furthermore, it is optionally possible within the scope of the invention that after the data has been saved (i.e. in particular after the respective fingerprints and the respective result information have been completely saved, possibly by several time-shifted saving methods), the following steps are provided, which are preferably performed one after the other or in any order, possibly also repeatedly:

evaluating the stored fingerprints, in particular based on the stored result information, so that an evaluation result is determined, determining a control matrix on the based on the evaluation result, which is performed for the control, in particular evaluation, of at least one subsequent method execution.

In particular, the determination of the control matrix can include the adaptation of an existing control matrix. This has the advantage that the control matrix can be continuously optimized.

Another possibility could be that the evaluation of the stored fingerprints includes a (statistical) analysis of the fingerprints, preferably a trend analysis, preferably depending on the corresponding stored result information. In particular, the result information can be used to draw conclusions as to the extent to which the monitoring information and/or recipe information influence product properties, in particular the quality of the film. Alternatively or additionally it is therefore also conceivable that the evaluation of the stored fingerprints takes place by determining a correlation of the fingerprints with one another and/or with respect to the stored result information, so that preferably at least one value range for at least one individual parameter of the recipe information and/or of monitoring information of the fingerprints, which is specific for a predetermined product property, is determined. In particular, the predetermined product property is a product property of predetermined quality (and thus corresponds in particular to a desired quality which the film is to exhibit). If necessary, the predetermined product property can also be parameterized, e.g. by user input at the control system.

A further advantage may be that the evaluation result is compared with a given, in particular empirical, information in order to perform a control, in particular a plausibility check, of the evaluation result. Alternatively or additionally, it can also be provided that the evaluation result is compared with information that is determined on the basis of a correlation of the data. This enables a reliable control of the method executions.

In particular, it may also be possible in the case of method according to the invention, that the data also include fingerprints and/or result information for method executions which are specific to a negative (poor) quality. For example, to provide fingerprints and/or result information, method executions are performed with recipe information and/or under conditions which (intentionally) cause insufficient film quality. This enables in particular a "training" of the evaluation or evaluation of the data in order to determine for example a correlation, in particular causality, of the data (in particular between the fingerprints and the result information) and/or to identify bad result information and/or to perform a control.

It is also advantageous that the method according to the invention if the result information in each case comprises at least a first portion of information about a resultant product property of the film produced in the respective associated method execution, wherein preferably a control matrix is determined depending on a comparison of the first portion of information (about the resultant product property) with a second portion of information about a predetermined product property, so that, in particular on the basis of the control matrix, an evaluation can take place for subsequent method executions with regard to the predetermined product property (in particular as desired quality). In other words, the result information includes information about the actual quality of the film produced, where the control matrix is used to control subsequent method executions to see if a desired given product property is achieved.

It may optionally be possible for a control matrix to be determined (i.e. newly determined or an existing one adapted) for the control on the basis of the stored data, wherein at least one comparison criterion, in particular a tolerance value range, of the control matrix is determined and/or (an existing one adapted) for this purpose, so that preferably the comparison criterion, in particular the tolerance value range, is specific for achieving a predetermined product property in the subsequent method execution. In other words, the stored data can be used to determine such a tolerance range, which is typical (or specific) for the given product property. If subsequent method executions, i.e. their fingerprints, are compared with this tolerance range, film production can be easily controlled.

Advantageously, the invention may provide for at least one of the following steps to be performed, preferably one after the other or in any order, for example also repeatedly, after the data has been stored (i.e. after the step of storing the respective fingerprints and result information):

determining a control matrix adapted for control for at least one subsequent method execution, determining at least one subsequent fingerprint for the at least one subsequent method execution, preferably on the basis of monitoring information and/or a specific recipe information of the subsequent method execution, comparing values of the subsequent fingerprint with a comparison criterion (in particular a tolerance value range) of the control matrix, so that at least one comparison result is determined for checking film production, control of the subsequent method execution based on the comparison result.

In particular, the control includes an evaluation and/or adjustment and/or visualization and/or control and/or regulation of the method execution, in particular to be able to guarantee a predetermined film quality. The steps mentioned can be performed for each subsequent method execution, for example.

It may also be possible within the scope of the invention that a determination of a control matrix comprises a determination of a tolerance value range as a comparison criterion (for values of at least one subsequent fingerprint) in order to control the subsequent method execution on the basis of the associated fingerprint. In particular, the values of the following fingerprint are values of monitoring information of the fingerprint. This has the advantage that the method execution can be controlled simply and adaptably.

It may preferably be possible for a fingerprint of a subsequent method execution to be compared with at least one comparison criterion of a control matrix for the purpose of controlling, so that the method execution is checked, preferably evaluated and/or adapted and/or visualized and/or controlled and/or regulated depending on the comparison criterion on the basis of the comparison. This allows the method execution to be controlled in a simple and quick manner.

It may be advantageous if, within the scope of the invention, the respective result information is provided by determining at least one product property of a film which is produced in a respective associated method execution, wherein determining the product property comprises at least one of the following steps:

measuring the tensile strength of the film, in particular by performing a tensile test on the film, manual input of user information about the film, especially an evaluation of the slide, determination of processing parameters during further processing of the film, preferably automated by a processing machine, in particular by a film roll, determining at least one barrier property of the film, determining at least one optical property of the film, determining at least one geometry property of the film, determining at least one mechanical property of the film, determining the basis weight of the film, determining of a quality index for the film, whereby the quality index is preferably determined for the film depending on the running meter.

In particular, the different properties of the film with regard to permeation and diffusion against gases and liquids are referred to as barrier properties. The barrier properties are, for example, dependent on the molecular structure of the plastics and the processing. This allows a versatile and meaningful evaluation of the film quality.

Furthermore, it may be provided within the scope of the invention that the result information and/or the fingerprints each comprise position information which is determined depending on running meters for a film produced during the method execution, so that preferably depending on running meters at least one piece of information is assigned to a respective result information (in particular information about a product property) in each case to recipe information and/or monitoring information of an associated fingerprint. For example, a position range of the film can be determined in this way on the basis of the stored data, in which the produced film has a particularly good quality.

In addition, it may be advantageous in the context of the invention that, in at least one subsequent method execution, at least one associated subsequent fingerprint and at least one associated subsequent result information are provided in order to adapt an (existing) control matrix on the basis of an evaluation of the subsequent fingerprint and the subsequent result information, so that the control matrix is preferably adapted iteratively for subsequent method executions. This step can be repeated especially for further method executions in order to continuously adapt and optimize the control matrix.

It may also be provided that after the data has been stored, in particular when the fingerprints stored have been evaluated, subsequent steps are performed, preferably one after the other:

determining at least one filter information which is specific for a specific product property of the film, comparing the filter information at least partially with the stored result information, determining at least one control matrix depending on this comparison, so that at least one such fingerprint, and in particular at least one associated method execution, whose associated result information has an approximation (i.e. also an identity) to the specific product property, is selected on the basis of the control matrix.

In particular, this enable homogeneous or similar products or products (films) of a certain quality to be quickly and reliably filtered out. For example, a certain position information can be determined by the filter information and/or by the control matrix.

Another object of the invention is a control system for controlling a film production in which at least one film can be produced depending on at least one specific recipe information:

at least one provision unit for providing different fingerprints, the fingerprints characterizing different method executions for producing a film, and for providing at least one result information for the respective fingerprint in each case, the result information in each case being specific for at least one product property of the film (in each case) produced, a processing unit for storing the fingerprints and the result information as data in a data system, so that the data can be made available as an evaluation basis for control of at least one subsequent method execution (in particular centrally).

Thus, the inventive control system has the same advantages as those described in detail with reference to a method according to the invention. In addition, the control system may be capable of being operated in accordance with a method in accordance with the invention.

Another object of the invention is a computer program product for controlling a film production in which at least one film is produced depending on at least one specific recipe information.

In particular, it is provided that the computer program product is adapted to be processed by a processing apparatus so that the subsequent steps are performed:

provision of different fingerprints, whereby different method executions for the production of a film are characterized by the fingerprints, providing in each case at least one result information for the respective fingerprints, the result information being specific for at least one product property of the film (respectively) produced, storing the fingerprints and the result information as data in a data system, in particular a database for electronic data management, so that the data are made available as an evaluation basis for control of at least one subsequent method execution.

Thus, the computer program product according to the invention has the same advantages as described in detail with regard to a method and/or control system according to the invention. In addition, the computer program product may be capable of performing a method in accordance with the invention.

The computer program product may, for example, be configured as a data carrier and/or as a computer-readable storage medium and/or as a firmware and/or the like, which comprises a computer program for performing the steps (of the method according to the invention).

BRIEF DESCRIPTION OF THE SEVERAL VIEWS OF THE DRAWINGS

Further advantages, features and details of the invention result from the following description, in which embodiments of the invention are described in detail with reference to the drawings. The features mentioned in the claims and in the description may be essential to the invention either individually or in any combination. They show schematically:

In the following figures, the identical reference signs are used for the same technical properties, even for different embodiments.

DESCRIPTION OF SPECIFIC EMBODIMENTS OF THE INVENTION

Figure 1:
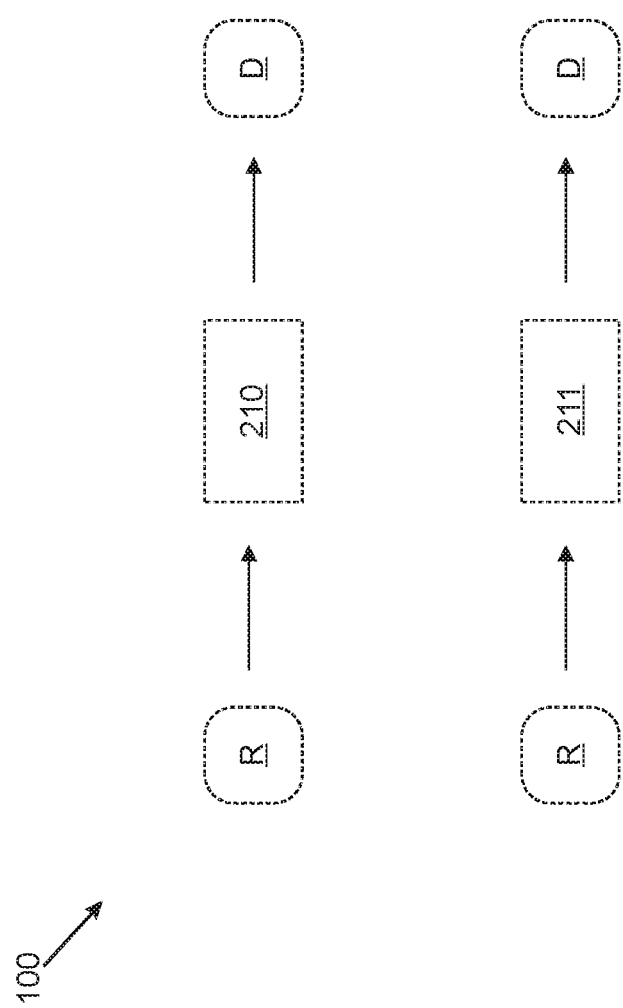
FIG. 1 representation for the visualization of a method according to the invention, FIG. 2 further representation for the visualization of a method according to the invention, FIG. 3 further representation for the visualization of a method according to the invention, FIG. 4 a representation of a control system according to the invention, FIG. 5 further representation of a control system according to the invention for the visualization of a method according to the invention.

FIG. 1 schematically visualizes a method 100 according to the invention. In this case, it may be provided that, according to a recipe information R, a method execution 210 is performed. As a result of this method execution 210, a film with at least one product property D is produced depending on the recipe information R. In order to characterize the method execution 210, monitoring information I can be determined, for example, by measuring individual parameters in the method execution 210, and made available with recipe information R as a fingerprint F.

The film produced in method execution 210 has at least one product property D, which determines the quality of the film and thus the result of method execution 210. In order to be able to draw conclusions about this result of method execution 210, result information E can be provided for method execution 210. This is determined, for example, by laboratory tests on the film or a user input to evaluate the film or the like, and is therefore specific for the product property D. Both the fingerprint F and the result information E can then be stored in a data system 200 (non-volatile). These steps can be repeated for additional method executions 210 so that different fingerprints F and result information E are provided for different method executions 210 and stored as data in the data system 200. This data can then be used as the basis for control of at least one subsequent method execution 211.

Conventionally, to test the quality of the subsequent method execution 211, the produced film can only be examined in the laboratory after the (complete) subsequent method execution 211 has been completed, or feedback from further processing or use of the film can be used to determine the product property D of the produced film of the subsequent method execution 211. In particular, the inventive method 100 allows improved control of film production and/or film quality, whereby evaluations of the (expected) film quality and/or product property D can be provided for subsequent method executions 211, in particular without the need for complex laboratory testing. This can preferably already take place during the subsequent method execution 211 and/or shortly thereafter.

In particular, the control of the subsequent method executions 211 can be performed by determining a control matrix M on the basis of the stored data. For example, a subsequent fingerprint F can be determined for a respective subsequent method execution 211 and compared with the control matrix M. In other words, the control matrix M can be used as an evaluation basis to determine or predict the film quality on the basis of fingerprint F without costly examinations of the film, in particular already at the time of production of the film (i.e. during the active subsequent method execution 211).

Figure 2:
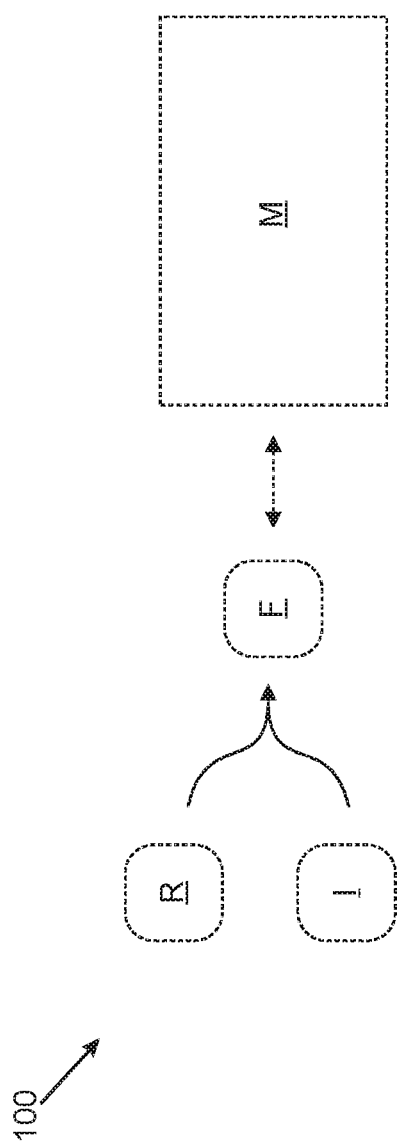

As shown in FIG. 2, the fingerprint F is determined on the basis of monitoring information I and a recipe information R of the associated method execution 210 or subsequent method execution 211, in order to enable a comparison with the control matrix M.

Figure 3:
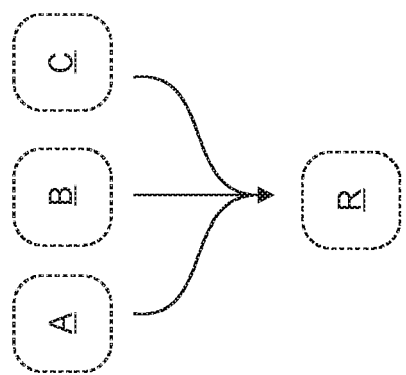

FIG. 3 shows that the recipe information R can contain information about various individual parameters, such as, for example, about at least one material mixture A and/or about at least one method parameter B and/or about at least one method variable C. This information can at least partially be used to parameterize at least one film production machine to produce a film according to the recipe information R in a method execution 210.

Figure 4:
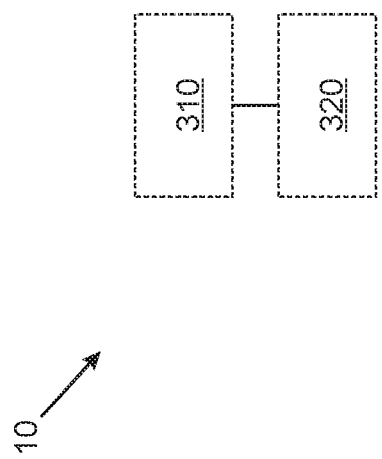

FIG. 4 schematically shows a control system 10. The control system 10 can have at least one supply unit 310 for providing different fingerprints F, whereby the fingerprints F characterize different method executions 210 for producing a film. Further, the providing unit 310 may serve to provide at least one result information E for the respective fingerprint F, the result information E being specific for at least one product property D of the produced film. Furthermore, a processing unit 320 of the control system 10 can be provided for storing the respective fingerprints F and result information E as data in a data system 200, so that the data can be provided as an evaluation basis for a control of at least one subsequent method execution 211.

Figure 5:
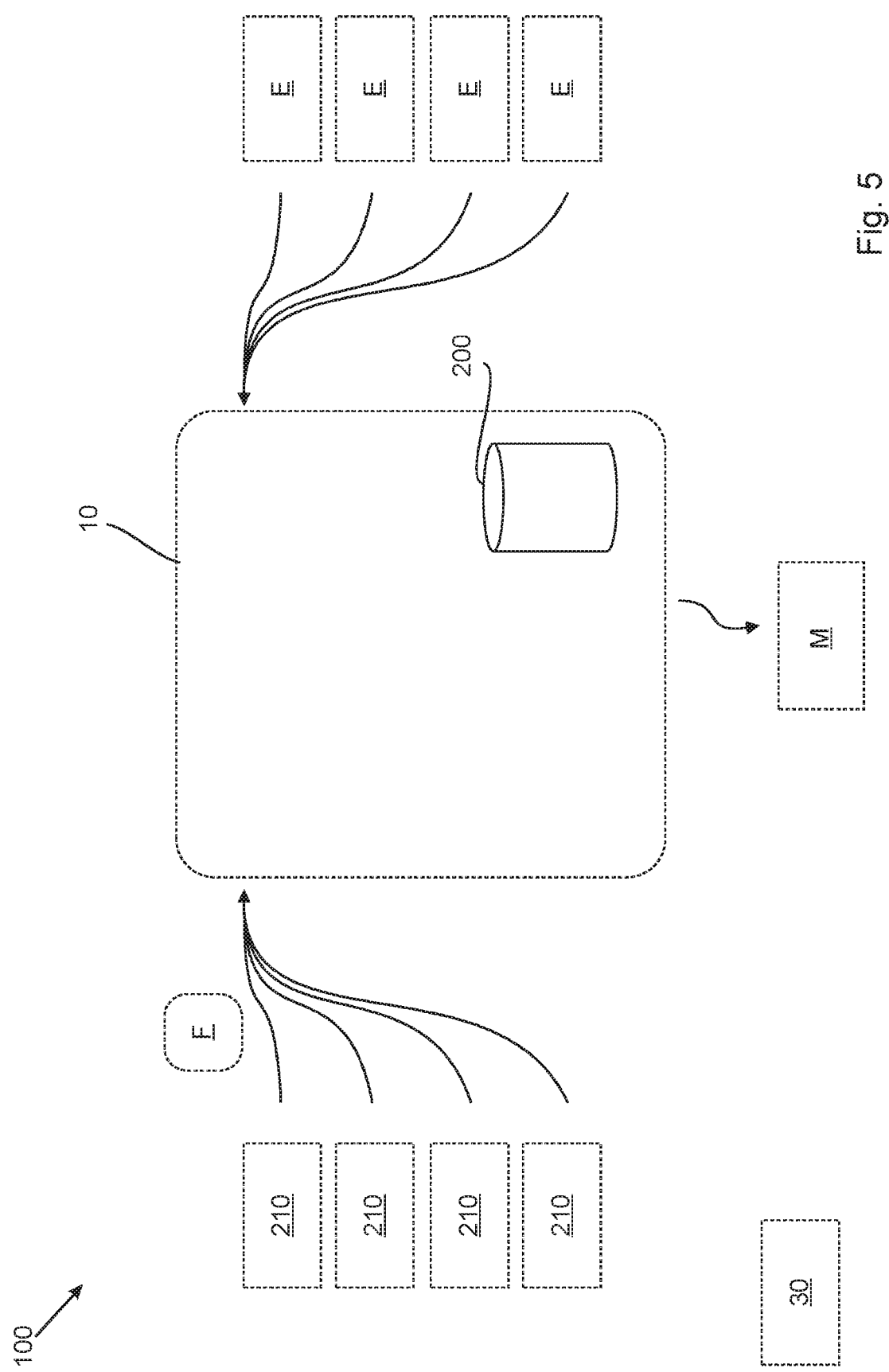

FIG. 5 schematically visualizes a method 100 according to the invention with further details. It may be possible that a large amount of monitoring information I is determined for a large number of different method executions 210. These can then be provided in each case with the recipe information R of the respective method execution 210 as fingerprint F of this respective associated method execution 210 in a data system 200 (in particular the control system 10). The data system 200 comprises a provision unit 310, for example. The data system 200 is preferably configured as a database system, e.g. as a computer system with a database or as a software database system. Accordingly, the provision unit 310 may include an electronic component of the computer, such as a processor or data interface, or a software interface (such as SQL) or the like.

In particular, a single fingerprint F thus comprises at least the specific recipe information R for an associated method execution 210 and also the monitoring information I of the associated method execution 210 to characterize the associated method execution 210.

In addition, the result information E can be determined which, for example, includes information on product properties D of the manufactured films. These can then be used for an evaluation (e.g. by a processing unit 320 or a processing device 30, such as a computer or processor of a computer) to determine a correlation with the fingerprints F. In order to enable the fingerprints F, which each belong to a specific method execution 210 and characterize them, to be assigned to those result information E which are specific for the film produced in the corresponding respective method execution 210, the result information E may, for example, comprise an identifier, coding and/or position information or the like, which thus refers to the associated fingerprint F. The evaluation can then be used, for example, to determine a control matrix M, i.e. in particular also to adapt an existing control matrix M.

The preceding explanation of the embodiment describes the present invention exclusively in the context of examples. Of course, individual features of the embodiments can be freely combined with each other, if technically reasonable, without leaving the scope of the present invention.

REFERENCE CHARACTER LIST

10 Control system
30 Processing device
100 Methods
200 Data system
210 Method execution
211 Subsequent method execution
310 Supply unit 320 Processing unit
A Material mixing
B Method parameters
C Method variable
D Product property
E Result information
F Fingerprint
I Monitoring information
M Control matrix
R Recipe information

What is claimed is:

1. A method for controlling film production, in which at least one film is produced depending on at least one specific recipe information, comprising:
   determining different fingerprints, the fingerprints characterizing different method executions for producing a film,
   wherein determining the fingerprints comprises the following actions:
      determining respective monitoring information for a respective method execution,
      determining a respective fingerprint on the basis of the respective monitoring information and a respective specific recipe information of the method execution so that the respective method execution is characterized on the basis of the fingerprint,
   determining in each case at least one result information for the respective fingerprint,
the result information being specific for at least one product property of the produced film,
storing the respective fingerprints and the result information as data in a data system so that the data are provided as an evaluation basis for a control of at least one subsequent method execution,
   and after storing the data:
   evaluating the stored fingerprints and the result information as an evaluation result,
   determining a control matrix on the basis of the evaluation result, wherein the control matrix is configured for controlling the at least one subsequent method execution,
   wherein the fingerprints and the result information from previous method executions are used to control subsequent method executions, so that a time-consuming and costly analysis and evaluation of the quality of a subsequent method execution is avoided.

2. The method according to claim 1, wherein the evaluation of the stored fingerprints comprises at least one of a statistical analysis of the fingerprints or a trend analysis depending on the associated stored result information.

3. The method according to claim 1, wherein the stored fingerprints are evaluated by determining at least a correlation of the fingerprints with one another or with respect to the stored result information, so that at least one value range of at least one individual parameter of the recipe information or of monitoring information of the fingerprints, which is specific for a predetermined product property, is determined.

4. The method according to claim 1, wherein the evaluation result is compared with predetermined information in order to perform a control of the evaluation result.

5. The method according to claim 1, wherein the result information in each case comprises at least a portion of information about a resulting product property of the film produced during the respective method execution, the control matrix being determined depending on a comparison of the information about the resulting product property with information about a predefined product property, so that an evaluation for subsequent method executions with regard to the predefined product property can take place on the basis of the control matrix.

6. The method according to claim 1, wherein the control matrix is determined for the control using the stored data, at least one tolerance value range of the control matrix being at least determined or adapted for this purpose, so that the tolerance value range is specific for achieving a predetermined product property in the subsequent method execution.

7. The method according to claim 1, wherein after storing the data, the following actions are provided:
   determining the control matrix adapted for control of at least one subsequent method execution,
   determining at least one subsequent fingerprint for the at least one subsequent method execution on the basis of at least one of monitoring information or a specific recipe information of the subsequent method execution,
   comparing values of the subsequent fingerprint with a tolerance value range of the control matrix so that at least one comparison result is determined for controlling film production,
      control of the subsequent method execution on the basis of the comparison result.

8. The method according to claim 1, wherein the respective result information is provided by determining at least one product property of a film produced in a respective method execution, wherein determining the product property comprises at least one of the following actions:
   measuring the tensile strength of the film,
   manual input of user information about the film,
   determining processing parameters during further processing of the film automated by a processing machine for further processing,
   determining of at least one barrier property of the film,
   determining at least one optical property of the film,
   determining at least one geometry property of the film,
   determining at least one mechanical property of the film,
   determining the basis weight of the film,
   determining a quality index for the film, wherein the quality index being determined for the film as a function of a running meter.

9. The method according to claim 1, wherein at least the result information or the fingerprints each comprise position information which is determined for a film produced during the method execution depending on a running meter, so that at least one information of a respective result information is assigned depending on at least the running meter to recipe information or monitoring information of an associated fingerprint.

10. The method according to claim 1, wherein at least one associated subsequent fingerprint and at least one associated subsequent result information are provided in the at least one subsequent method execution in order to adapt the control matrix on the basis of an evaluation of the subsequent fingerprint and the subsequent result information, so that the control matrix is optimized iteratively for subsequent method executions.

11. The method according to claim 1, wherein after the data have been stored subsequent actions are performed:
   determining at least one filter information specific to a specific product property of the film,
   comparing the filter information at least partially with the stored result information,
   determining the control matrix depending on this comparison, so that at least one such fingerprint, whose associated result information has an approximation to the specific product property, is selected on the basis of the control matrix.

12. A control system for controlling film production, in which at least one film can be produced depending on at least one specific recipe information, with:
- at least one interface for providing different fingerprints, the fingerprints characterizing different method executions for producing a film, and for providing in each case at least one result information for the respective fingerprint, the result information being specific for at least one product property of the produced film,
- a processor for storing the respective fingerprints and result information as data in a data system, so that the data can be made available as an evaluation basis for the control of at least one subsequent method execution;
- wherein the control system is operated in accordance with a method for controlling film production, in which at least one film is produced depending on at least one specific recipe information, comprising:
- determining different fingerprints, the fingerprints characterizing different method executions for producing a film, wherein determining the fingerprints comprises the following actions:
  - determining respective monitoring information for a respective method execution,
- determining a respective fingerprint on the basis of the respective monitoring information and a respective specific recipe information of the method execution so that the respective method execution is characterized on the basis of the fingerprint,
- determining in each case at least one result information for the respective fingerprint, the result information being specific for at least one product property of the produced film,
- storing the respective fingerprints and the result information as data in a data system so that the data are provided as an evaluation basis for a control of at least one subsequent method execution, and after storing the data:
- evaluating the stored fingerprints and the result information as an evaluation result,
- determining a control matrix on the basis of the evaluation result,
- wherein the control matrix is configured for controlling the at least one subsequent method execution,
- wherein the fingerprints and the result information from previous method executions are used to control subsequent method executions, so that a time-consuming and costly analysis and evaluation of the quality of a subsequent method execution is avoided.

13. A non-transitory computer-readable medium storing a computer-readable program code for controlling a film production in which at least one film is produced in dependence on at least one specific recipe information, the computer-readable program code being adapted to be processed by a processing apparatus so that the following actions are performed:
- determining different fingerprints, the fingerprints characterizing different method executions for producing a film, wherein determining the fingerprints comprises the following actions:
  - determining respective monitoring information for a respective method execution,
- determining a respective fingerprint on the basis of the respective monitoring information and a respective specific recipe information of the method execution so that the respective method execution is characterized on the basis of the fingerprint,
- determining in each case at least one result information for the respective fingerprint, the result information being specific for at least one product property of the produced film,
- storing the respective fingerprints and the result information as data in a data system so that the data are provided as an evaluation basis for a control of at least one subsequent method execution, and after storing the data:
- evaluating the stored fingerprints and the result information as an evaluation result,
- determining a control matrix on the basis of the evaluation result, wherein the control matrix is configured for controlling the at least one subsequent method execution,
- wherein the fingerprints and the result information from previous method executions are used to control subsequent method executions, so that a time-consuming and costly analysis and evaluation of the quality of a subsequent method execution is avoided.

\* \* \* \* \*